Figure 3:
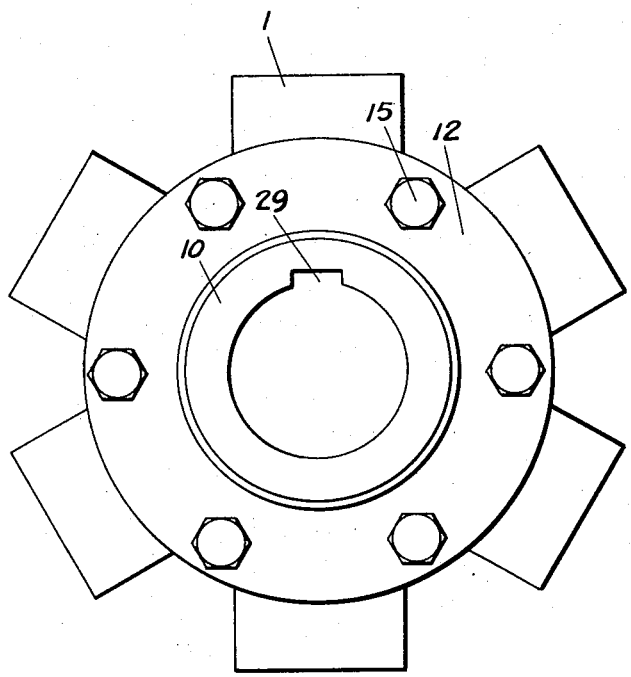

Sept. 1, 1959     H. REICH     2,901,896
ELASTIC COUPLING
Filed June 27, 1958     2 Sheets-Sheet 1
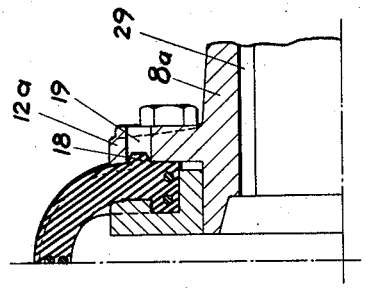
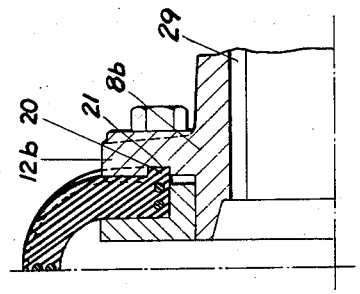
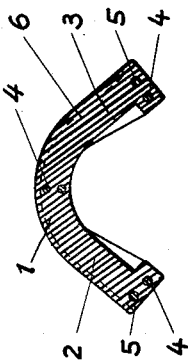
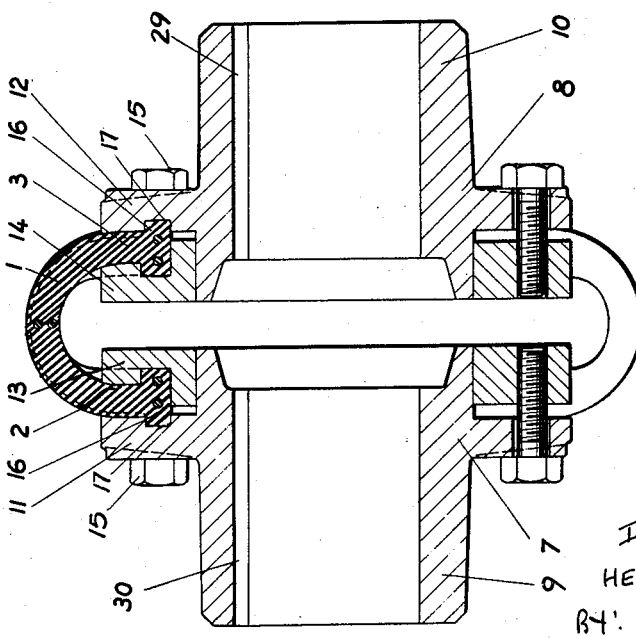
INVENTOR:
HERWARTH REICH
BY:
MICHAEL S. STRIKER
ATTORNEY.

United States Patent Office 2,901,896
Patented Sept. 1, 1959

2,901,896

ELASTIC COUPLING

Herwarth Reich, Bochum, Germany

Application June 27, 1958, Serial No. 745,148

Claims priority, application Germany November 21, 1957

6 Claims. (Cl. 64—11)

The present invention relates to an elastic coupling, and more particularly to a coupling in which two substantially axially aligned rotatable shafts are connected by a resilient member of arcuate cross section peripherally attached to said shafts.

Resilient connecting members of this type are of substantially arcuate or U-shaped cross section, the leg portions of the resilient member being joined by a central yoke element. The leg portions of the resilient member are peripherally fastened to the shafts which are to be coupled and the yoke portion extends radially outward therefrom. Such resilient connecting members are commonly reinforced with fibrous reinforcement elements arranged at an angle to the axis of the coupling and extending in a direction from one half of the coupling to the other. Such couplings have proved to be satisfactory in many respects. They are capable of absorbing substantial axial, radial, and angular misalignment of the shafts which are to be coupled with each other, and have a material damping effect preventing the transmission of shock or oscillatory vibrations from one shaft to the other.

A resilient connecting member of this type of coupling is readily replaceable without requiring disassembly of the associated machinery. Such replacement is particularly convenient when a plurality of segmental resilient connecting members are employed instead of a single resilient member. Such an arrangement is for example described in my copending application Serial No. 490,073, now Patent No. 2,840,998.

Use of couplings of the aforedescribed type is not possible where the coupling itself exerts axial forces on the shafts to be coupled which are greater than are permissible under any given conditions. Such axial forces exerted by the coupling on the shafts may lead to premature wear of supporting bearings and other machine elements. Axial tensile forces are created by the reinforcing fibrous inserts spiraling at an angle from one half of the coupling to the other when rotary motion is to be transmitted. The major source of axial tensile stresses is the centrifugal force exerted by the mass of the resilient connecting member itself. Radially outward acting centrifugal forces transmitted by the leg portions of the connecting member tend to pull the two coupled shafts towards each other. Although couplings of the aforedescribed type have been in use for many years and although the problem of tensile forces exerted by the coupling on the shafts has been well known for a long time, no means were found so far to overcome difficulties caused thereby.

It is the principal object of the present invention to provide a coupling in which the coupling elements themselves during rotation of the coupling will not exert tensile forces in an axial direction on the shafts coupled.

It is another object of the invention to provide such a coupling without additional expense.

Other objects and many of the attending advantages of this invention will be readily appreciated as the same becomes better understood by reference to the following detailed description when considered in connection with the accompanying drawings therein:

Fig. 1 is a sectional elevation of a connecting element of the invention in the unstressed condition, Fig. 2 illustrates an axial section of a coupling of the invention, Fig. 3 is a front elevation of the coupling of Fig. 2, Figs. 4 and 5 are fragmentary axial sections through modifications of the coupling of Fig. 2.

According to a principal feature of the present invention tensional stresses created by the coupling member itself are avoided by axially prestressing the elastic coupling member whereby compressive stresses are set up in the coupling member which counteract tensional stresses created during rotation of the coupling and tending to move the two coupled shafts axially toward each other. The axial prestressing of an elastic connecting member is preferably of such magnitude as to precisely balance the axial forces created during rotation of the coupling. Such compressive prestressing creates an unbalanced force acting on the shafts when standing still. This force is opposite to the force which would be created during rotation without prestressing of the resilient element. The compressive force creates stresses in the bearings supporting the shafts to be coupled but such stresses are not of significance since they occur only when the mechanism is at rest.

The principal feature of the invention is applicable to all couplings of the type in which two coupling discs are connected either by an annular resilient member of arcuate cross section or by a plurality of arcuately shaped segmental members. Such resilient connecting members are usually made from rubber or rubber-like material and are reinforced by fibrous reinforcements of greater tensile strength and lower elasticity than said rubber or rubber-like material. The two halves of the coupling must either be arranged or must be adjustable to such an axial distance after installation of the resilient connecting member that the attachment portions of the resilient connecting member are at a distance after installation which is smaller than the distance of the attachment portions of the connecting member in the unstressed condition so that the connecting member is axially compressed when installed in the coupling.

Such an installation is facilitated by an additional feature of the present invention according to which the resilient connecting member is clamped on each shaft by two annular clamping elements one of which is fixedly fastened to the periphery of the shaft and abuts from the outside against the resilient connecting member whereas the second clamping element is movably and adjustably fastened to this element and abuts on the connecting member from the inside. The movable annular clamping member is preferably guidedly supported on the hub of the coupling. Such a coupling is particularly suitable for use with segmental resilient members of the type shown in my afore cited copending application. The legs of the individual substantially U-shaped connecting members can then be compressed and inserted between the fixed clamping elements mounted respectively on the two shafts to be coupled and will hold themselves there by their own elasticity during completion of the assembly operation.

In order to assure proper registering of the resilient members with the clamping elements of the coupling, I prefer to provide the fixed clamping elements of the coupling which abut from the outside against the resilient connecting member with recesses mating corresponding projections on the resilient connecting member to assure perfect relative positioning.

Referring now to the drawings there is shown in Fig.

1 a sectional view of a segmental connecting member of the invention comprising a yoke portion 1 and leg portions 2 and 3. The leg portions extend from the yoke portion at an angle greater than 90° and substantially equal to 120°. The connecting member consists largely of rubber or similar material. It is provided with fibrous reinforcements 4 which are formed by an endless thread embedded in the rubber mass of connecting member in form of a multiple figure 8 as described in more detail in my copending application Serial No. 490,073, now Patent No. 2,840,998. An additional strand of threads forms the reinforcement 5 embedded along the edges of the connecting members. Furthermore, the connecting member is provided with a layer of reinforcing fabric 6 embedded near the outer surface thereof.

Figs. 2 and 3 show the assembled coupling of the invention in axial section and in front elevation respectively. There are shown the halves 7 and 8 of a coupling comprising two sleeves 9 and 10 to be fastened to respective shaft ends and secured against rotation by keyways 29 and 30 respectively. Annular clamping elements 11 and 12 are integrally connected to sleeves 9 and 10 respectively and have faces arranged opposite each other in the assembled condition of the coupling which are provided with annular grooves 17 mating corresponding annular projections 16 on the legs 2, 3 of the resilient connecting member. Movable clamping rings 13, 14 are axially slidable on sleeves 9 and 10 respectively and are fastened to fixed annular clamping elements 11, 12 by means of tightening screws 15.

To assemble the coupling of the invention, the two halves of the coupling are mounted on the corresponding shafts. Screws 15 are turned to move the clamping rings 13, 14 away from the fixed clamping elements 11, 12. The individual segmental connecting members are flexed in compression until they can be inserted between the fixed clamping elements 11, 12 and until projections 16 are aligned with recesses 17. Upon release of the compressive force, the resilient connecting member snaps into engagement. Assembly is then completed by tightening screws 15 and pulling movable clamping rings 13, 14 tightly against the inner side of the connecting member.

While this assembly stands still, the leg portions 2, 3 of the resilient connecting members exert pressure against the abutting faces of the fixed clamping elements 11, 12 which is transmitted to the shafts mounted in sleeves 9, 10 and finally absorbed by the bearings in which the shafts are supported. Under static conditions, such pressures will be insignificant and will not have any detrimental effect.

When the shafts rotate, the yoke portion 1 of the resilient connecting member is forced outward by centrifugal force and sets up tensional forces in the leg portions 2, 3. These tensional forces have an axial and a radial component. In a symmetrical arrangement of one or several connecting members, the radial elements of the tensional forces balance each other. The axial component of these tensional forces will tend to pull the two shafts towards each other. With the novel connecting member of the invention such axial force components are counteracted by the resilience of the connecting member. It is apparent that for a fixed set of conditions including the speed of rotation of the coupled shafts and the elastic properties and mass of the connecting member, such a member can be designed by one skilled in the art to precisely balance the axial tension developed during rotation of the coupling. Under most conditions, however, it will be satisfactory to balance the axial forces in the coupling only in an approximate manner with either the tensile or the compressive axial stresses prevailing to a minor degree. It will thus be seen that a limited number of standard types of resilient connecting members will be able to substantially reduce axial stresses in the coupling of the invention under any practical conditions.

Figs. 4 and 5 illustrate embodiments of the device of the invention employing modified means for ensuring firm engagement of the resilient connecting element with the clamping elements of the coupling.

As shown in Fig. 4, the clamping element 12a fixedly fastened to sleeve 8a is provided with an opening 19 passing through the entire thickness of the clamping element and adapted to receive the mating lug-shaped projection 18 on the resilient connecting member. Such an arrangement holds the connecting member less firmly against radial displacement than an annular projection cooperating with an annular groove as illustrated in Fig. 2, but such a weaker anchorage is acceptable in many cases and it is more convenient and less expensive to machine open holes than an annular groove in the fixed clamping element.

In the arrangement shown in Fig. 5, the fixed clamping element 12b integral with sleeve 8b is formed with axially projecting radial ribs defining between them a radial groove 21 engaged by a corresponding radial projection of the connecting member preventing tangential displacement of a segmental connecting member.

Without further analysis, the foregoing will so fully reveal the gist of the present invention that others can by applying current knowledge readily adapt it for various applications without omitting features that, from the standpoint of the prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An elastic coupling for two rotatable shafts in substantial axial alignment comprising, in combination, two attachment means each arranged on one of said shafts, said attachment means being spaced from each other a predetermined distance; a resilient connecting member having a substantially arcuate cross section and two free attachment end portions spaced in unstressed condition at a greater distance from each other than said predetermined distance; and means for securing said attachment end portions of said resilient connecting member to said attachment means respectively mounted on said shafts in compressed condition wherein the distance of said attachment portions of said connecting member is equal to said predetermined distance of said attachment means from each other, whereby axial tensile forces exerted by said resilient connecting member on said shafts during rotation thereof are counteracted by the resilient reaction of said connecting member to said compressed condition.

2. An elastic coupling for two rotatable shafts in substantial axial alignment comprising, in combination, two attachment means each arranged on one of said shafts, said attachment means being spaced from each other a predetermined distance; a plurality of resilient connecting segmental members having a substantially arcuate cross section and two free attachment end portions spaced in unstressed condition at a greater distance from each other than said predetermined distance; and means for securing said attachment end portions of said resilient connecting member to said attachment means respectively mounted on said shafts in compressed condition wherein the distance of said attachment portions of said connecting member is equal to said predetermined distance of said attachment means from each other, whereby axial tensile forces exerted by said resilient connecting member on said shafts during rotation thereof are counteracted by the resilient reaction of said connecting member to said compressed condition.

3. An elastic coupling for two rotatable shafts in substantial axial alignment comprising, in combination, two attachment means each arranged on one of said shafts, said attachment means being spaced from each other a predetermined distance; a resilient connecting member having a substantially arcuate cross section including a yoke portion and two free attachment end portions spaced in unstressed condition at a greater distance from each other than said predetermined distance and enclosing with said yoke portion an angle of more than 90°; and means for securing said attachment end portions of said resilient connecting member to said attachment means respectively mounted on said shafts in compressed condition wherein the distance of said attachment portions of said connecting member is equal to said predetermined distance of said attachment means from each other, whereby axial tensile forces exerted by said resilient connecting member on said shafts during rotation thereof are counteracted by the resilient reaction of said connecting member to said compressed condition.

4. An elastic coupling for two rotatable shafts in substantial axial alignment comprising, in combination, two attachment means each arranged on one of said shafts, said attachment means being spaced from each other a predetermined distance; a resilient connecting member having a substantially arcuate cross section including a yoke portion and two free attachment end portions spaced in unstressed condition at a greater distance from each other than said predetermined distance and enclosing with said yoke portion an angle of substantially 120°; and means for securing said attachment end portions of said resilient connecting member to said attachment means respectively mounted on said shafts in compressed condition wherein the distance of said attachment portions of said connecting member is equal to said predetermined distance of said attachment means from each other, whereby axial tensile forces exerted by said resilient connecting member on said shafts during rotation thereof are counteracted by the resilient reaction of said connecting member to said compressed condition.

5. An elastic coupling for two rotatable shafts in substantial axial alignment comprising, in combination, two attachment means each arranged on one of said shafts, said attachment means being spaced from each other a predetermined distance; a resilient connecting member having a substantially arcuate cross section and two free attachment end portions spaced in unstressed condition at a greater distance from each other than said predetermined distance, said attachment means including a fixed clamping element fixedly arranged on one of said shafts for abutment against the outside of one of said attachment end portions, and a clamping element axially movable relative to said fixed element for abutment against the inside of said one attachment end portion; and means for securing said attachment end portions of said resilient connecting member to said attachment means respectively mounted on said shafts in compressed condition wherein the distance of said attachment portions of said connecting member is equal to said predetermined distance of said attachment means from each other, whereby axial tensile forces exerted by said resilient connecting member on said shafts during rotation thereof are counteracted by the resilient reaction of said connecting member to said compressed condition.

6. An elastic coupling for two rotatable shafts in substantial axial alignment comprising, in combination, two attachment means each arranged on one of said shafts, said attachment means being spaced from each other a predetermined distance; a resilient connecting member having a substantially arcuate cross section and two free attachment end portions spaced in unstressed condition at a greater distance from each other than said predetermined distance; and means for securing said attachment end portions of said resilient connecting member to said attachment means respectively mounted on said shafts in compressed condition wherein the distance of said attachment portions of said connecting member is equal to said predetermined distance of said attachment means from each other, said attachment means and said resilient connecting member being formed with a respective projection and recess, whereby axial tensile forces exerted by said resilient connecting member on said shafts during rotation thereof are counteracted by the resilient reaction of said connecting member to said compressed condition.

References Cited in the file of this patent
UNITED STATES PATENTS

| 1,664,052 | Ungar | Mar. 27, 1928 |
| 2,648,958 | Schlatman | Aug. 18, 1953 |

FOREIGN PATENTS

| 880,980 | Germany | Aug. 10, 1953 |